(No Model.)

2 Sheets—Sheet 1.

W. R. EDGINGTON.
MACHINE FOR MEASURING GRAIN.

No. 261,210. Patented July 18, 1882.

Witnesses;

Inventor;
Warren R. Edgington
per attys.

(No Model.) 2 Sheets—Sheet 2.

W. R. EDGINGTON.
MACHINE FOR MEASURING GRAIN.

No. 261,210. Patented July 18, 1882.

Witnesses:
Charles Fowler,
H. B. Applewhaite.

Inventor:
Warren R. Edgington
per attys
A. H. Evans & Co.

UNITED STATES PATENT OFFICE.

WARREN R. EDGINGTON, OF WATERLOO, IOWA.

MACHINE FOR MEASURING GRAIN.

SPECIFICATION forming part of Letters Patent No. 261,210, dated July 18, 1882.

Application filed March 15, 1882. (No model.)

*To all whom it may concern:*

Be it known that I, WARREN R. EDGINGTON, of Waterloo, Iowa, have invented a new and useful Improvement in Machines for Measuring Grain, of which the following is a full, clear, and exact description, reference being had to the accompanying drawings, making a part of this specification, in which—

Figure 1:
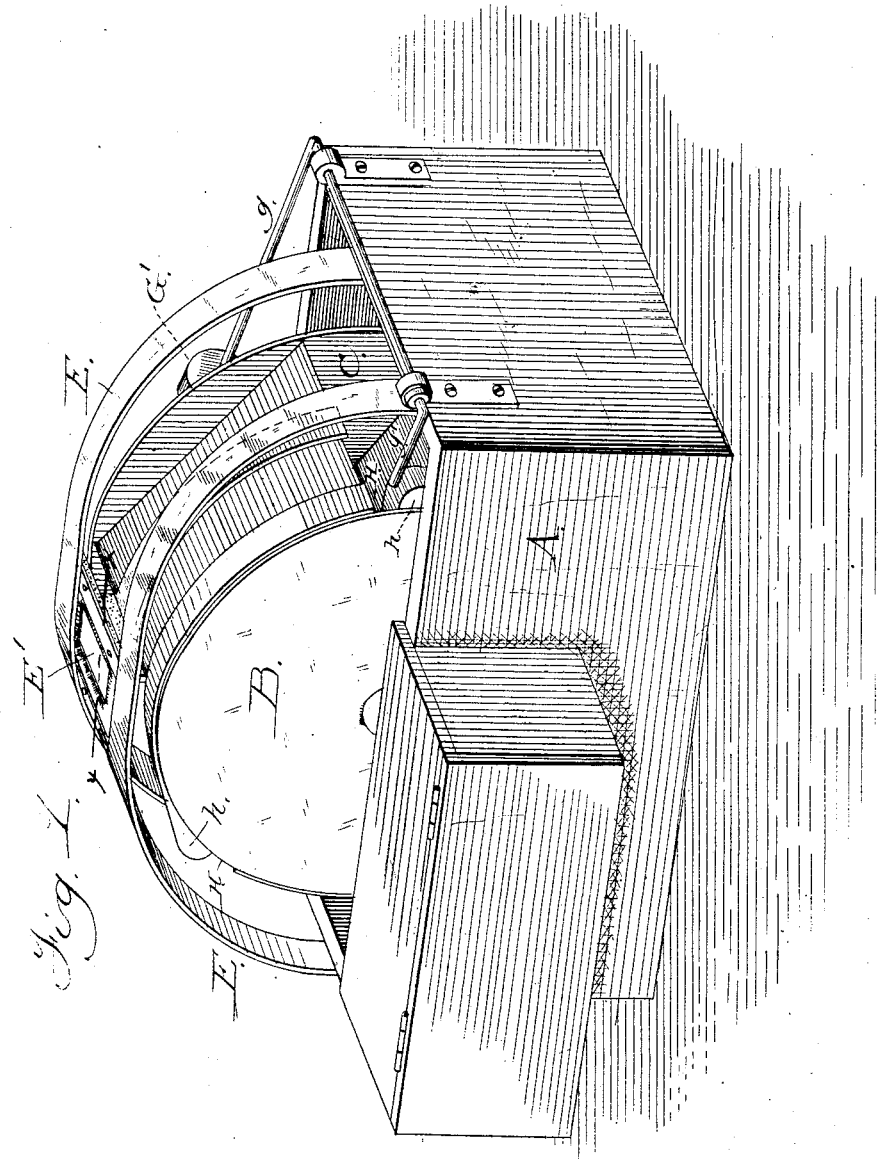
Figure 2:
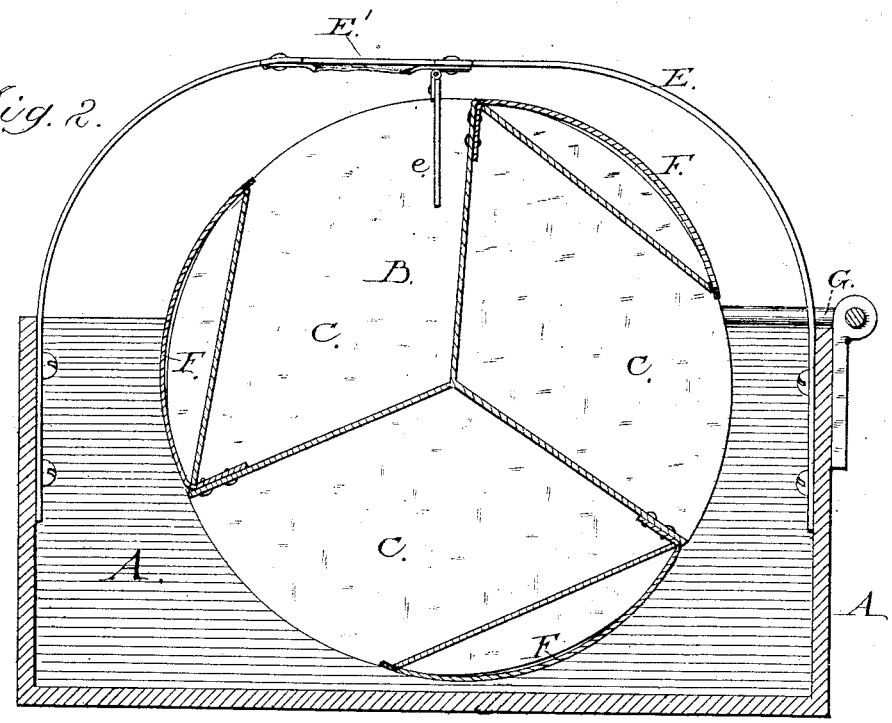
Figure 3:
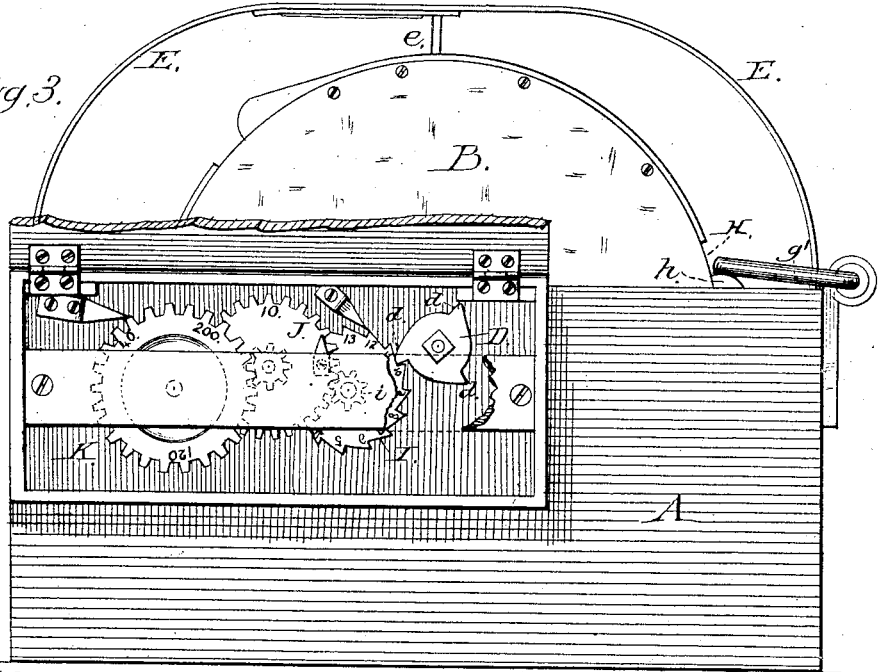

Figure 1 is a perspective view of a grain-measurer with my improvements attached. Fig. 2 is a vertical section through the line $x\ x$ of Fig. 1. Fig. 3 is a side elevation, showing the registering device.

My invention has reference to devices for automatically measuring or weighing small grain as it passes from elevators or other points of storage to its point of destination; and it consists in the combination of devices hereinafter described and claimed.

To enable others skilled in the art to make and use my invention, I will describe the exact manner in which I have carried it out.

In the drawings, A represents the frame in which revolves the measuring-wheel B, the latter provided with any desired number of buckets, C, into which the grain passes to be registered or weighed. The axle of this wheel has its bearings in the frame A, and on one end of the axle is secured a block, D, provided with fingers $d$, corresponding in number to the buckets in the wheel B, for the purpose hereinafter explained.

Above the wheel B, and attached to the frame A, is the metal frame E, provided at its central point with the opening E', and having a swinging door, $e$, for closing the opening E'. The spaces between the buckets C are provided with projecting curved spring-pieces F, which press against the swinging door $e$ and cause the same to close automatically during the revolution of the wheel and while there is no bucket beneath the opening to receive the grain. Immediately above this opening rests the spout leading from the elevator or other reservoir.

On one end of the frame A is pivoted the bent rod G, provided with the arms $g$ and $g'$. On the long arm $g$ is secured the adjustable weight G' as a counterpoise to the weight or measure of the grain received into the bucket C. If it be intended to measure the grain, this adjustable counterpoise is placed in position to counterbalance a bushel or any other desired quantity to be measured in one bucket; or, if the grain is to be weighed, it is placed so as to counterbalance one hundred or any other desired number of pounds of grain. The short arm $g'$ rests upon the periphery of the wheel B, and drops into the socket H at a point to arrest the movement of each bucket in turn immediately under the opening E', and the bucket cannot move from its position without raising the arm $g'$ by means of the cam $h$, and this necessarily raises also the weight G' on the long arm $g$.

From this description it is evident that if the weight G' has been adjusted for weighing a hundred pounds of grain, when that amount is in the bucket C the wheel B will be partially revolved by the weight of the grain, the counterbalance will be lifted, and the wheel will continue to rotate until the next bucket passes under the opening E', when the short arm $g$ will again fall into another socket H, and the swinging door be allowed to fall of its own weight and grain be admitted into the next bucket, the descending bucket discharging its grain into any desired receptacle as each bucket is passed in turn with its desired quantity of measured grain. The axis of the wheel B, while rotating, causes one finger of the block D at each movement of a bucket to come in contact with a cog on the registering-wheel I and revolve it one space, and this is repeated each time a bucket descends.

The axle of the wheel I carries a pinion, $i$, which meshes into the second registering-wheel, J, and that in turn has on its axle a pinion which meshes into the large registering-wheel K. These three indicating-wheels may be adjusted to each other in any manner desired. Each wheel is provided with an index-finger to point out the number of bushels or pounds registered at any given time.

Having thus explained my invention, what I claim as new, and desire to secure by Letters Patent, is—

The wheel B, provided with the buckets C, and the cams $h$ and sockets H on the periphery of the wheel, in combination with the rectangularly-bent rod G, provided with the arms $g$ $g'$ and the adjustable counterpoise G', all constructed substantially as and for the purpose set forth.

WARREN R. EDGINGTON.

Witnesses:
GEO. MASON,
G. T. EDGINGTON.